(12) United States Patent
Hollenbeck et al.

(10) Patent No.: US 6,819,745 B2
(45) Date of Patent: Nov. 16, 2004

(54) METHOD AND APPARATUS OF TESTING A POTS CIRCUIT AND DSL CIRCUIT THROUGH A SPLITTER

(75) Inventors: Michael Hollenbeck, Geneva, FL (US); Joel Futterman, Deltona, FL (US); Gunter Neumeier, Longwood, FL (US)

(73) Assignee: Siemens Information and Communication Networks, Inc., Boca Raton, FL (US)

( * ) Notice: Subject to any disclaimer, the term of this patent is extended or adjusted under 35 U.S.C. 154(b) by 380 days.

(21) Appl. No.: 10/159,207

(22) Filed: May 30, 2002

(65) Prior Publication Data

US 2002/0196908 A1 Dec. 26, 2002

Related U.S. Application Data

(60) Provisional application No. 60/294,201, filed on May 30, 2001.

(51) Int. Cl.[7] .............................................. H04M 3/22
(52) U.S. Cl. .................. 379/1.03; 379/9.06; 379/10.02; 379/15.03
(58) Field of Search ............................. 379/1.04, 1.01, 379/1.03, 28, 29.01, 9.06, 10.02, 15.01, 15.03, 16, 17, 20, 21, 22.02, 22.04, 26.01, 27.01, 27.04, 27.06, 31, 29.08, 27.03

(56) References Cited

U.S. PATENT DOCUMENTS

| | | | |
|---|---|---|---|
| 6,295,339 B1 | * | 9/2001 | Jollota ..................... 379/22.04 |
| 6,453,015 B1 | * | 9/2002 | Benedict et al. ......... 379/27.01 |
| 6,470,074 B2 | * | 10/2002 | Teixeria ................... 379/32.04 |
| 6,496,566 B1 | * | 12/2002 | Posthuma .................... 379/22 |

OTHER PUBLICATIONS

Article entitled "Streamlining DSL Remote Loop Management + IVR = Low Cost Provisioning" by Rick Suehring (5 pp); XChange Magazine; Jul. 2000, available at www.x-changemag.com/articles/071feat2.html.

* cited by examiner

Primary Examiner—Curtis Kuntz
Assistant Examiner—Barry W Taylor

(57) ABSTRACT

A simple means is provided to test the cross connect wiring of a communications system which uses a POTS splitter to separate broadband and narrow band signals. A suitable frequency test signal such as 1 KHz tone is fed at sufficient amplitude to the broadband port of the POTS splitter, so that even after attenuation by both the POTS splitter capacitance and inductance filters, it is detectable by suitably sensitive detectors connected to the narrow band port of the POTS splitter. The test signal may be applied intermittently to enable its detection even in low signal to noise situations.

16 Claims, 5 Drawing Sheets

METHOD AND APPARATUS OF TESTING A POTS CIRCUIT AND DSL CIRCUIT THROUGH A SPLITTER

CROSS REFERENCE TO RELATED APPLICATION

This application claims the benefit of priority under 35 U.S.C. 119(e) to copending U.S. patent provisional application Ser. No. 60/294,201 and filed on May 30, 2001, the contents of said application being incorporated by reference herein in its entirely.

This application is also related to the following U.S. patent applications: U.S. patent application Ser. No. 10/159,210 filed May 30, 2002 entitled AN INTEGRATED ACCESS PLATFORM; U.S. patent application Ser. No. 10/159,205 filed May 30, 2002 entitled METHOD FOR OPERATING AND APPARATUS FOR A BACK-PLANE SUPPORTING REDUNDANT CIRCUIT CARDS; U.S. patent application Ser. No. 10/157,436 filed May 30, 2002 entitled METHOD AND APPARATUS FOR LOADING A MIRROR IMAGE SOFTWARE COPY ACROSS CIRCUIT CARDS; U.S. patent application Ser. No. 10/159,207 filed May 30, 2002 entitled METHOD AND APPARATUS FOR A COMMON MANAGEMENT SOFTWARE SYSTEM; U.S. patent application Ser. No. 10/159,208 filed May 30, 2002 entitled METHOD AND APPARATUS FOR PROVIDING A COMMON TEXT MESSAGING SYSTEM WITHIN A SOFTWARE ARCHITECTURE; U.S. patent application Ser. No. 10/159,209 filed May 30, 2002 entitled METHOD AND APPARATUS FOR PROVIDING A STATE MACHINE OPERATING ON A REAL-TIME OPERATING SYSTEM; and U.S. patent application Ser. No. 10/159,206 filed May 30, 2002 entitled METHOD AND APPARATUS FOR ADMINISTERING MULTIPLE PROVISIONABLE OBJECTS, the contents of each of said applications being incorporated by reference herein in their entirely.

BACKGROUND OF THE INVENTION

1. Field of the Invention

The invention generally relates to the installation and testing of communications systems which use low and high pass frequency splitters to offer both broadband and narrow band services over a single twisted pair line connection and more particularly to testing the continuity of connections in telecommunications systems which use POTS Splitters in order to offer Plain Old Telephone Service (POTS) and Digital Subscriber Line (DSL) services over a single twisted pair connection.

2. Brief Description of the Prior Art

The Internet is a worldwide interconnection of computers that has made a vast array of multimedia, audio, video, graphics and text information available to home users on their computers, game consoles and other digital devices. This Internet content typically requires millions of bits of digital data to be transmitted from or downloaded to the user's digital device. The voice telephone network built up over the past 125 years provides a comprehensive physical connectivity between homes and has become used as a way of linking home users to the Internet. However, the telephone system was designed for narrow band voice communications, and the all important "last mile" connection to customers homes was built of twisted pair copper wire. Conventional voice-band data modems using these twisted pair telephone lines to transmit data at less than 56 kilobits per second. The user's ability to quickly obtain and view information using such modems is substantially limited.

To try and meet their customers' desire for high-speed connections to the Internet, telephone companies have attempted to upgrade their networks and add higher speed services such as Asymmetrical Digital Subscriber Lines (ADSL) and Digital Subscriber Lines (DSL). ASDL, as described in for instance the International Telecommunication Union (ITU) Standards Document ITU G.992.1 consists of a pair of Discrete Multitone (DMT) modems, one at each end of a twisted pair subscriber loop, with band splitters at each end to provide isolation between a high frequency spectrum (above 24 KHz) used for data transmission and lower frequencies (0–4 KHz) used for voice transmission or Plain Old Telephone Service (POTS). These modems use DMT technology to provide high data bandwidth and the ability to adapt the data rate at startup to match the transmission and noise characteristics of each individual subscriber loop. The band splitters at each end are usually called POTS splitters.

These high-speed digital transmissions were never envisaged by the telephone systems original designers. Consequently much of the legacy engineering, including the light gauge copper cable, as well as typical enhancement such as load coils, filters and bridged taps, provide significant obstacles to providing such high speed services. Moreover, ADSL and DSL are complex technologies involving sophisticated equipment and software that can require skilled technicians to install and maintain. It has been reported by R. Suehring in Xchange Magazine that 85 percent of DSL and ADSL installations are unsuccessful on their first attempt, and that amongst the significant causes of the failure are connectivity issues. SUEHRING, R. "Streamlining DSL," Xchange, July 2000. Retrieved from the Internet.

When a customer orders a high speed ADSL data link, rewiring typically occurs at the telephone company's Main Distribution Frame. In this rewiring the existing subscriber connection to a POTS circuit has to be rewired to a POTS splitter, then outputs from the splitter connected to the original POTS circuit and to an associated ADSL circuit. A standard method of testing connectivity is a simple resistance test using DC current. POTS splitters are simple telephone devices which function by using capacitors to block DC current and ringing from reaching the ADSL data line and inductors to block high-frequency ADSL signals from reaching the POTS circuit. Having DC blocking capacitors in the splitter prevents the use of simple resistance measurements to test whether or not the rewiring from the Main Distribution Frame has connected the splitter to the correct ADSL line.

What is needed is a simple apparatus and test that will allow checking of this rewiring across the blocking capacitors and inductors of a POTS splitter.

SUMMARY OF THE INVENTION

Briefly described, the purpose of the current invention is to provide a simple means of testing the connectivity of wiring through a capacitor/inductor frequency splitter so as to be able to quickly test and verify the set up of a communications system that uses such a splitter to provide subscribers with both broadband and narrowband services over a single physical connection.

In one embodiment of the invention, a simple means is provided to test the cross connect wiring of a communications system which uses a POTS splitter to separate the high frequency ADSL data from the DC and low frequency signals of a incoming telephone line. The simple means includes a low to mid frequency signal, such as but not limited to, a 1 KHz tone signal, fed at sufficient amplitude through the higher frequency or ADSL connection of the POTS splitter so that even after attenuation by the capacitance and inductance blocking filters within the POTS splitter, the resultant signal is detectable by a suitably sensitive detector connected to the associated POTS circuit.

In one embodiment of the invention, the input test signal is pulsed or applied intermittently so that it can be detected even in a system where the attenuation has significantly degraded the signal to noise ratio. Detection is done by simple correlation, i.e. by making sure that the detected signal is present only when the test signal itself is present.

The invention may be more fully understood by reference to the following drawings.

DETAILED DESCRIPTION OF THE INVENTION

During the course of this description like numbers will be used to identify like elements according to the different figures that illustrate the inventions.

Figure 1:
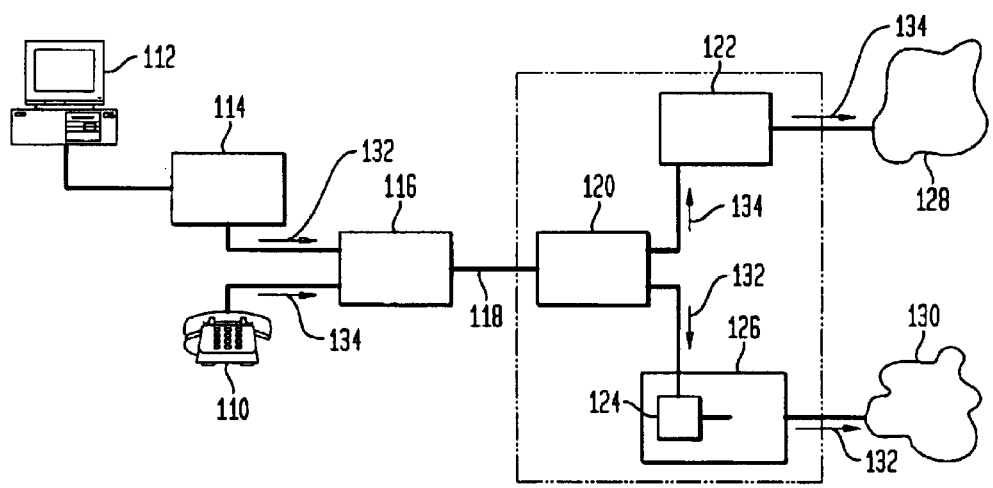
FIG. 1 is a schematic drawing showing an overview of a communication system having both broadband and narrow band communications over a single physical connection.

A communications system comprising a subscriber high-speed connection to the Internet over existing telephone connections is shown in FIG. 1. At the customer end this consists of a subscriber's telephone 110, a subscriber's digital device 112 which may be, but is not limited to a personal computer or a game console, and a modem 114, which may be but is not limited to, a high speed digital modem or an ADSL Termination Unit—Remote (ATU-R), and a broad and narrow band combining device 116, such as for example, a POTS splitter 120. The POTS splitter 120 is used for combining broadband signal 132 and narrowband signal 134 onto a single twisted pair telephone line 118. At the telephone company end of the single twisted pair telephone line 118 or copper wire connection that typically makes up the "last mile" connection between subscriber homes and the telephone company's distribution system is a device, such as for example a POTS splitter 120, for separating the narrowband signal 134 and broadband signal 132 being transmitted over the single twisted pair telephone line 118. After separation by the POTS splitter 120, the narrowband signal 134 is sent to a voice carrying circuit, which may be, for example, a POTS circuit 122 while the broadband signal 132 is sent to a suitable high speed digital modem 124, which may be but is not limited to a ADSL Termination Unit—Central (ATU-C). The high-speed digital modem 124, which in turn sends the data to other suitable data carrying circuits, may be part of an ADSL circuit 126. From the POTS circuit 122 the voice or narrowband signal 134 is connected to one or more second subscribers via the telephone network 128. Similarly from the data carrying circuit 126, the broadband signal 132 is transmitted to one or more digital devices such as computers by a data network 130 that may be the Internet. For simplicity in describing the subscriber high-speed connection to the Internet over existing telephone connection, signals have been described as flowing from the subscriber to the telephone network and data network although it is well known and understood that such signal flow is two way with each subscriber simultaneously transmitting and receiving broadband signals 132 and narrow band signals 132 i.e. voice communications.

Figure 2:
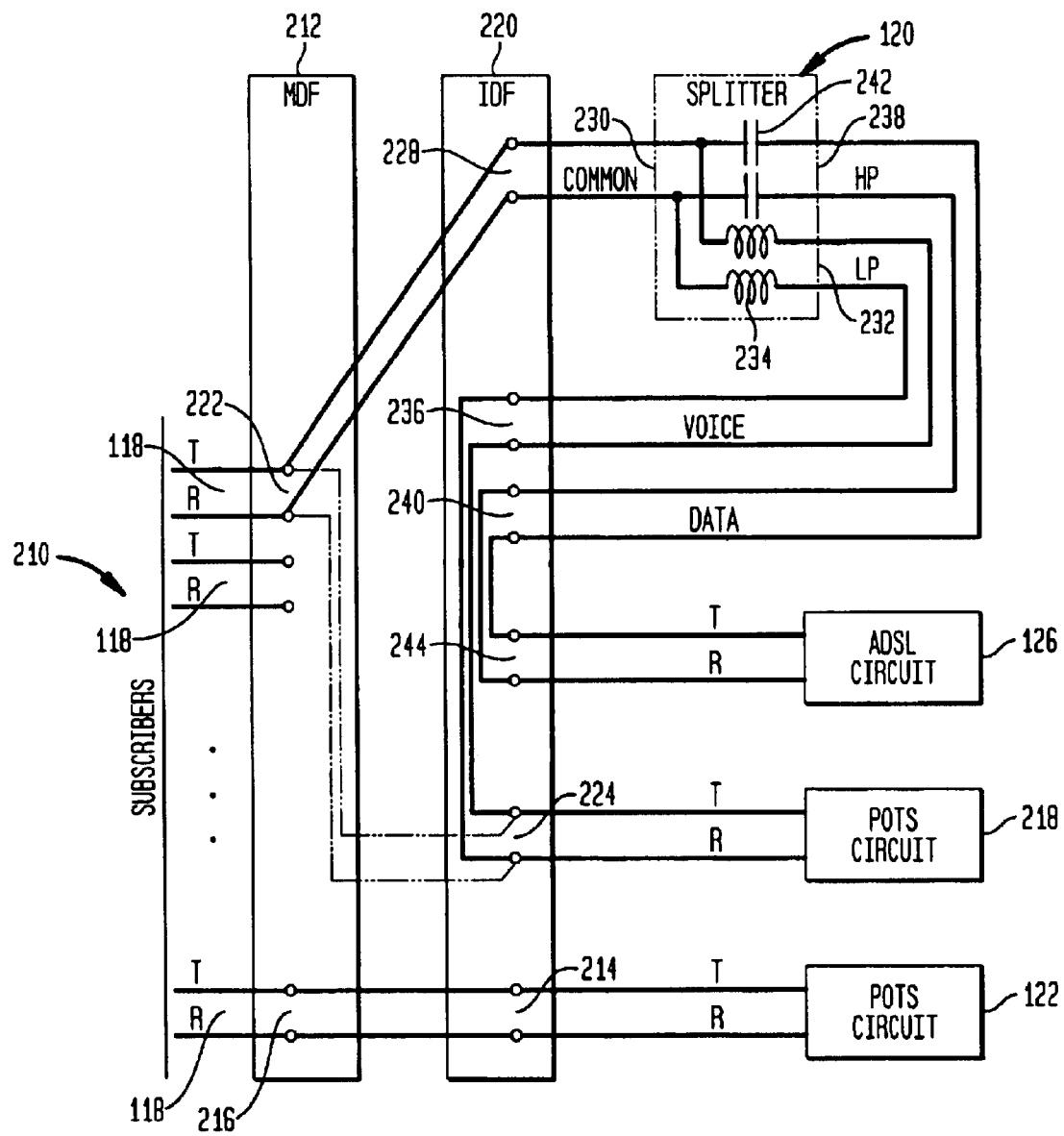
FIG. 2. is a schematic drawing of a typical POTS Splitter Insertion showing the rewiring when a customer orders ADSL service.

FIG. 2 is a schematic drawing of a how a typical POTS Splitter 120 insertion into a communications system is accomplished. FIG. 2 shows the rewiring at a telephone company's distribution plant when a customer orders ADSL service. A plurality of telephone subscribers 210 are connected to the telephone company's Main Distribution Frame (MDF) 212 by a plurality of twisted pair telephone lines 118, often referred to by field engineers as Tip and Ring (T/R) lines. A subscriber having a POTS only service is connected to a conventional subscriber connection port such as narrowband port 216 on the Main Distribution Frame (MDF) 212. This narrowband port 216, is in turn linked via an Intermediate Distribution Frame (IDF) Tip and Ring (T/R) port 214 on the Intermediate Distribution Frame (IDF) 220 to a voice circuit such as POTS circuit 122.

A subscriber who has ordered and been rewired for a combined voice and high speed data or ADSL service is shown connected to high speed subscriber connection port such as broadband port 222 on the Main Distribution Frame (MDF) 212. Dotted lines show how a high speed subscriber connection port such as broadband port 222 was originally wired as a plain voice service by being connected via a second IDF T/R port 224 to a second POTS circuit 218. The rewiring required for combined voice and data service is indicated by solid lines. The high-speed subscriber connection port, such as broadband port 222 on the Main Distribution Frame (MDF) 212 is now connected via an IDF common port 228 to a POTS splitter common port 230. The voice port, such as low pass POTS splitter port 232 is connected back to an IDF voice port 236 which in turn is connected back to the subscriber's original second IDF T/R port 224 and on to the subscriber's original second POTS circuit 218. These connections carry the voice or low frequency portion of the signal that has passed through the POTS splitter inductors 234.

The other part of the rewiring is the connection from the high pass POTS Splitter port 228 to the IDF data port 240. This connection carries high frequency or data signal that has passed through the POTS Splitter capacitors 242. The IDF data port 240 is connected to a third IDF T/R port 244 that in turn is connected to related ADSL circuit 126.

It is important that the wiring physically link the ADSL circuit 126 with the POTS circuit 218 assigned as being the associated circuit. However, testing such wiring in the field is not straight forward. As can be seen in FIG. 2, POTS Splitter 120 has POTS Splitter capacitors 242 in the high pass or data line and POTS Splitter inductors 234 in the low pass or voice line, which prevent a true board-to-board test between the ADSL circuit 126 and its associated second POTS circuit 218 using an isolated power source as such a test is in essence a DC test of connectivity and the capacitors do not pass DC current. This invention provides a method and apparatus to overcome this problem.

Figure 3:
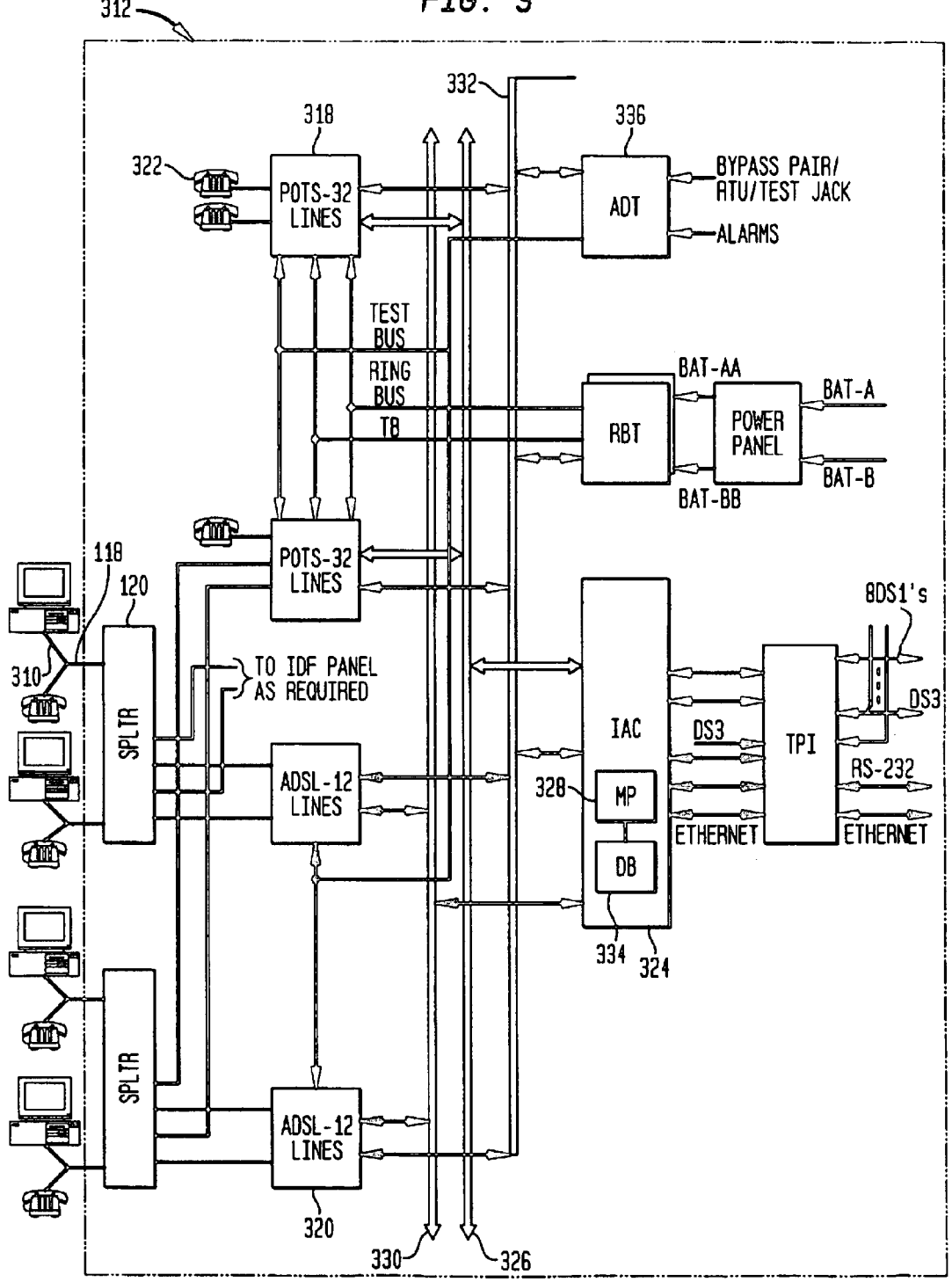
FIG. 3 is a schematic drawing of details of an integrated communications platform.

FIG. 3 is a schematic drawing of details of an integrated communications platform 312. A plurality of subscriber's equipment 310 is connected via a plurality of twisted pair telephone lines 118 to the integrated communications platform 312 via data splitters such as POTS Splitters 120. The POTS splitters 120 function is to split the combined data stream of broadband signal 132 and narrowband signal 134, sent over twisted pair telephone lines 118 into broadband and narrowband components corresponding to data and voice components. The POTS splitters 120 are connected to voice boards such as POTS-32 cards 318 and to and to data cards such as ADSL-12 card 320.

In an exemplary product manufactured by the Siemens Corporation, each POTS-32 card 318 contains 32 POTS circuits 118 as well as associated board control circuitry. Such a card is typical of voice cards used in the telecommunications industry. POTS circuits 118 on the POTS-32 card 318 are physically connected via Tip/Ring (T/R) ports 322 to the system's Intermediate Distribution Fame (IDF). Voice cards such as the POTS-32 card 318 typically have features such as a dedicated set of lines for payload, signaling and loop-back and a common set of clocks and frame signals as well as a subscriber line interface circuits (SLIC) which performs the analog interface to the T/R ports 322. Voice cards such as the POTS-32 card 318 typically communicates narrowband data by means of a narrow band bus 326 such as a Narrow Band (NB) Time Division Multiplex (TDM) Bus. In addition The POTS-32 card 318 typically communicates with a system controller 324 such as an Integrated Access Controller (IAC) over the Maintenance bus 332. The system controller 324 has a Microprocessor controller (MP) 328, such as but not limited to the Motorola MPC 850, which provides control signals for the narrow band bus 326.

In an exemplary product manufactured by the Siemens Corporation, each data card, e.g. ADSL-12 card 320, contains twelve ADSL circuits 126, each of which provides hardware to support appropriate features of data transport standards such as the well-known ADSL and Universal Asychronous Digital Subscriber Lines (UADSL) standards. Each ADSL circuits 126 is also individually connected to an assigned IDF T/R port 244. UADSL is sometimes also referred to as G.Lite. ADSL-12 card 320 also incorporates its own microprocessor such as the MPC 850 to provide operation, administration and maintenance functions related to the Asynchronous Transfer Mode (ATM) data handling. The ADSL-12 card 320 typically communicates ATM data over a broadband bus 330. In addition the ADSL-12 card 320 typically communicates with a system controller 324 over the Maintenance bus 332.

The system controller 324 typically provides the control and multiplexer functions for the ADSL-12 cards 320. The system controller 324 typically also has a system Database (DB) 334, which may be instructions stored in memory and accessed by the Microprocessor controller 328. The system Database (DB) 334 is used to configure the arrangement of the ADSL-12 cards 320 and the POTS-32 cards 318. In particular, the system Database 334 keeps track of the assigned associations among coupled POTS circuits 122, ADSL circuits 126 and POTS splitters 120, so that individual ADSL subscribers can appropriately receive both voice and data traffic. The aim of the present invention is to provide a simple and effective means to check that those assigned associations stored in Database 334 match the physical wiring changes required to provide both voice and data changes, as discussed in detail above in connection with FIG. 2.

The integrated communications platform 312 also has an Alarm Display and Test (ADT) board 336.

Figure 4:
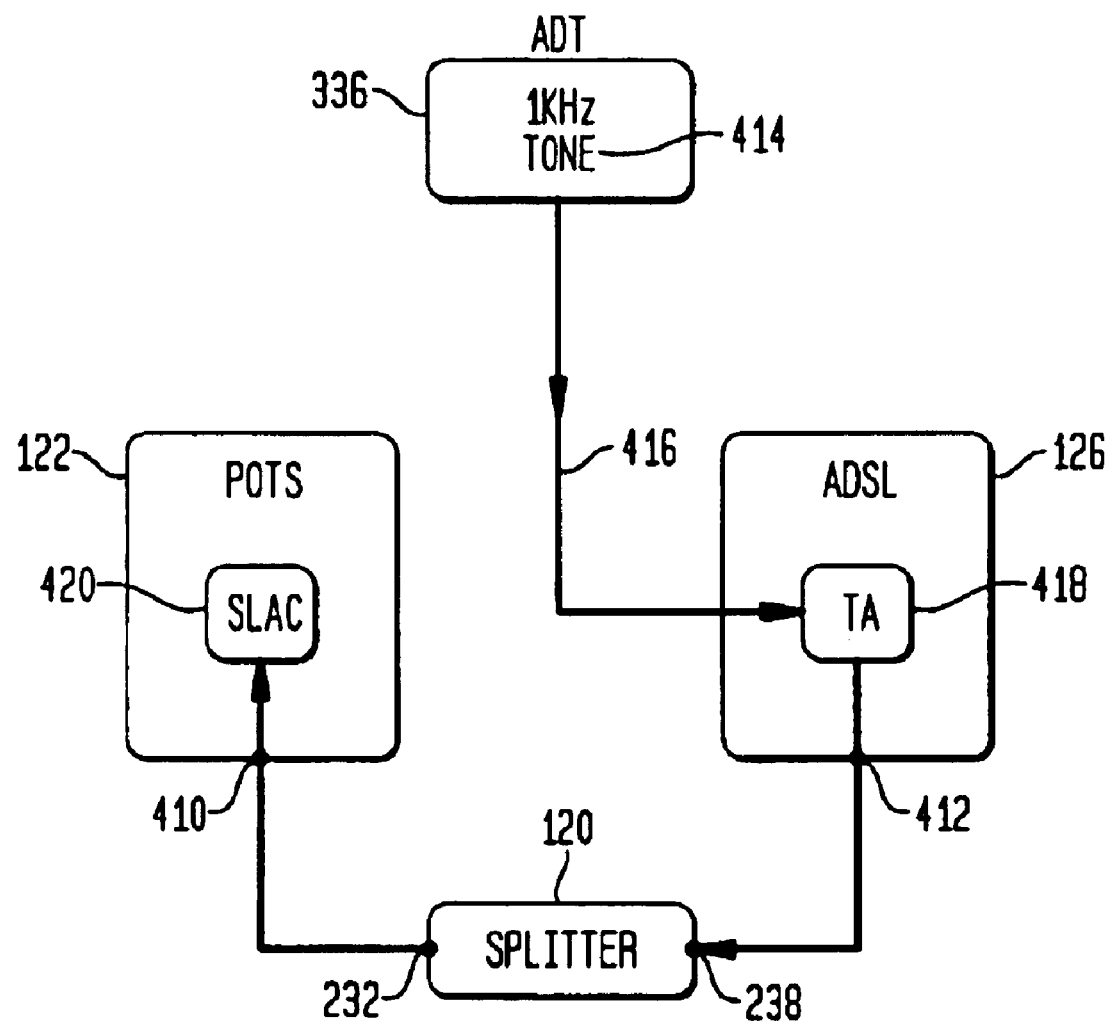
FIG. 4 is a schematic drawing of a board-to-board test.

FIG. 4 is a schematic drawing of a Digital Subscriber Line (DSL) pseudo-board-to-board test of this invention. The board-to-board test verifies the physical connection between a narrowband, voice circuit port, such as POTS circuit port 410 of a POTS circuit 122 which may be on a circuit card such as a Siemens POTS-32 card 318, and its associated broadband port, such as ADSL circuit port 412 of an ADSL circuit 126 which may be on a circuit card such as a Siemens ADSL-12 card 320. The assigned association between POTS circuit port 410 and ADSL circuit port 412 is stored in a database, such as for instance the System Database (DB) 334 of the system controller 324. The test is accomplished using a signal that can traverse both the low and high pass filter functions of the POTS splitter 120, such as but not limited to a 1 KHz tone 414 generated by, for instance, the Alarm Display and Test (ADT) board 336. To accomplish the test the 1 KHz tone 414 is sent via the testout line 416 to the Test Access (T/A) port 418 of the associated ADSL circuit 126. The 1 KHz tone 414 is transmitted from the ADSL circuit 126 via the ADSL circuit port 412 to the High pass POTS Splitter port 238. Some fraction of the 1 KHz tone 414 traverses the POTS Splitter 120 and is transmitted from the low pass POTS Splitter port 232 to POTS circuit port 410 and on to SLAC 420, where it is detected. Successful detection of the 1 KHz tone 414 verifies that the physical wiring of the system matches the assignment in system database 334.

Test access port 418 may be activated by software or by manually setting a physical relay.

Figure 5:
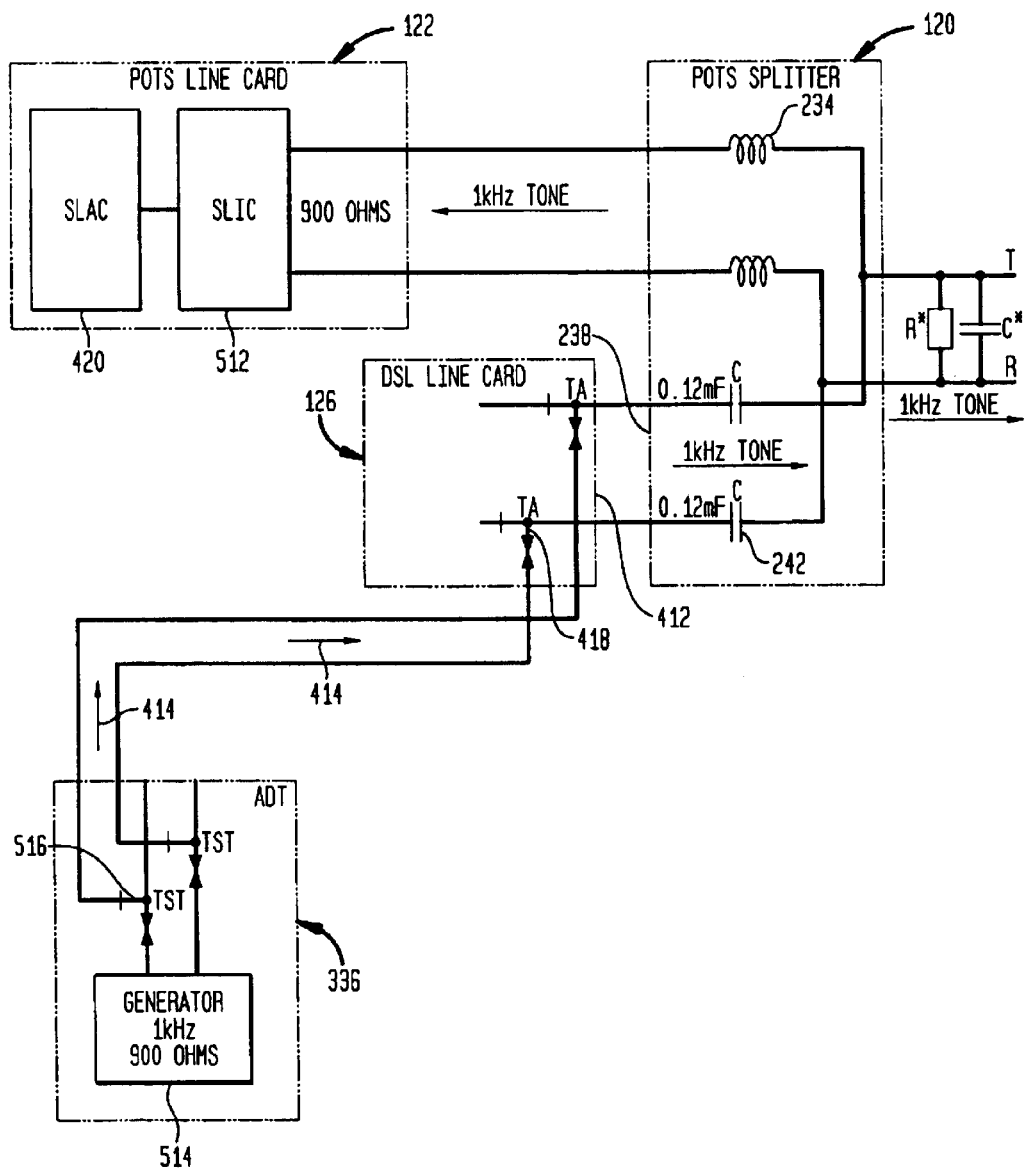
FIG. 5 is a schematic drawing of details of a board-to-board test.

FIG. 5 is a schematic drawing of details of a Pseudo Board to Board Test, part of a simple means to verify that the Main Distribution Frame (MDF) 212 and Intermediate Distribution Frame (IDF) 220 wiring between the POTS splitter 120, the high speed digital modem 124 portion of the data circuit, which may be an ADSL Termination Unit at the Central location (ATU-C) on an ASDL circuit 126, and the voice circuit, which may be a POTS line circuit 122, are all correctly installed, and if not, where the problem might be. A true board-to-board test function using an isolated power source is not possible because of the blocking capacitors 242 in the path of the high-pass filter portion of the POTS splitter 120.

After a subscriber orders ADSL service, the appropriate wiring changes described above in connection with FIG. 2 are made. Those changes are then tested for an appropriate match using the following method. Using Web browser access to the communications system, which may be but is not limited to the Siemens Accession Integrated Platform (AIP), the service person establishes the Pseudo Board to Board (PBTB) test configuration. This is done by setting the voice card, which in one embodiment of the invention is a POTS circuit 122, to function as a Tone Receiver. This may be accomplished by setting appropriate switches in the Subscriber Line Interface Card (SLIC) 512 and Subscriber Line Audio Circuit (SLAC) 420 of the POTS circuit 122. By further setting of switches in SLIC 512 and SLAC 420, the receive level of the POTS circuit 122 is set to its maximum sensitivity so as to be capable of detecting a small signal. The POTS circuit 122 receiving bandpass filters are also set to match the test signal that will be generated which in one embodiment is a 1 KHz tone 414. The companion data line card is then selected, which in one embodiment of the invention is the ADSL circuit 126. Test Access ports 418 on the ADSL circuit 126 are activated by setting appropriate relays. A test signal is then generated. This is done by selecting the Alarm Display and Test board 336 and connecting the signal generator 514 to the test access port 418 of the ADSL circuit 126 as shown in FIG. 4 and FIG. 5. Signal generator 514 is then activated to transmit a test signal, which in one embodiment is the 1 KHz tone 414. If the Main Distribution Frame 212 and Intermediate Distribution Frame 220 wiring is correct, the POTS line card 122 should detect the test tone and report its presence to the system controller which in turn can terminate the test.

In one embodiment of the invention, as verification that the 1 KHz tone 415 causing the Test Tone Present indication on the POTS circuit 122 is not spurious noise or some other signal, the system controller 334 can pulse the Test Tone (TST) relay 520 on the ADT board 336 or apply it intermittently. Detection is done by simple correlation, i.e. by making sure that signal is detected only when the test signal itself is being applied. In other words making sure that Test Tone Present indication on the POTS circuit 122 only occurs when Test Tone (TST) relay 520 is set to transmit 1 KHz tone 415.

While the invention has been described using a 1 KHz tone 415, it should be apparent to one skilled in the art that a range of test frequencies on either side of 1 KHz would work as test tones, the extent of the range of frequencies being dependent on the exact details of the values of the POTS Splitter capacitors 242 and the POTS Splitter inductors 234 as well as the power of the available signal generator 514 and the sensitivity of the SLAC 420 on the POTS circuit 122.

While the invention has been described with reference to particular embodiments, it will be appreciated by those of ordinary skill in the art that various modifications can be made to the steps of the method and the apparatus of the invention without departing from the spirit and scope thereof.

We claim:

1. An apparatus for testing a physical connection between a broadband port and a narrowband port in a communications system, said communications system having a broadband signal and a narrowband signal transmitted on a single twisted pair line and a splitter for separating said broadband signal and said narrowband signal, said testing comprising determining if said physical connection matches an assigned association between said broadband port and said narrow band port, said apparatus comprising:

storage means for storing said assigned association between said broadband port and said narrowband port;

a signal generator means for generating a test signal;

attaching means for sending said test signal generated by said signal generator to said broadband port;

routing means for passing said test signal from said broadband port through said splitter to said narrowband port; and, detection means attached to said narrowband port responsive to said test signal.

2. The apparatus of claim 1 wherein said storage means is a database.

3. The apparatus of claim 2 wherein said attaching means comprises activating a software-set switch.

4. The apparatus of claim 3 wherein said broadband port is an Asynchronous Digital Subscriber Line (ADSL) port and said narrow band port is a Plain Old Telephone System (POTS) port.

5. The apparatus of claim 4 wherein said detection means is a subscriber line audio processing circuit.

6. The apparatus of claim 5 wherein said test signal is generated intermittently.

7. The apparatus of claim 6 wherein said test signal is a frequency tone.

8. The apparatus of claim 7 wherein said test signal is a 1 KHz tone.

9. A method for testing a physical connection between a broadband port and a narrowband port in a communications system, said communications system having a broadband signal and a narrowband signal transmitted on a single twisted pair line and a splitter for separating said broadband signal and said narrowband signal, said testing comprising determining if said physical connection matches an assigned association between said broadband port and said narrow band port, said method comprising the steps of:

a. storing said assigned association between said narrowband port and said broadband port;

b. generating a test signal with a signal generator;

c. sending said test signal to said broad band port;

d. routing said test signal from said broadband port through said splitter to said narrowband port; and, e. detecting said test signal on said narrowband port, wherein detection of said test signal confirms said physical connection matches said assigned association.

10. The method of claim 9 wherein said storing step (a) includes:

f. the step of creating a database of said assigned associations between said ports.

11. The method of claim 10 wherein said sending step (c) includes:

g. the step of setting a software switch.

12. The method of claim 11 wherein said broad band port used is an Asynchronous Digital Subscriber Line (ADSL) port and said narrow band port used is a Plain Old Telephone System (POTS) port.

13. The method of claim 12 in which generating step (b) includes:

h. the step of making said test signal intermittent.

14. The method of claim 13 wherein said detecting step (e) is accomplished using a subscriber line audio processing circuit.

15. The method of claim 14 wherein said test signal is a frequency tone.

16. The method of claim 15 wherein said test signal is a 1 KHz tone.

* * * * *